(12) United States Patent
Kaburaki et al.

(10) Patent No.: US 6,406,914 B1
(45) Date of Patent: Jun. 18, 2002

(54) RADIATION EXPOSURE DOSE-HISTORY INDICATOR

(75) Inventors: Yoshiaki Kaburaki, Shizuoka; Daisuke Harumoto, Saitama; Hiromichi Mizusawa, Saitama; Yukiyo Niwa, Saitama; Hitoshi Shirase, Saitama, all of (JP)

(73) Assignee: Nichiyu Giken Kogyo Co., Ltd. (JP)

( * ) Notice: Subject to any disclaimer, the term of this patent is extended or adjusted under 35 U.S.C. 154(b) by 0 days.

(21) Appl. No.: 09/513,175

(22) Filed: Feb. 25, 2000

(30) Foreign Application Priority Data

Mar. 31, 1999 (JP) .......................... 11-091071
Mar. 31, 1999 (JP) .......................... 11-091072

(51) Int. Cl.$^7$ ............................. G01N 23/00
(52) U.S. Cl. ................. 436/1; 250/474.1; 250/482.1; 422/56; 422/57; 436/58
(58) Field of Search ............... 436/58, 57, 1; 422/58, 61, 22, 24, 55, 56, 57; 250/482.1, 474.1

(56) References Cited

U.S. PATENT DOCUMENTS 5,084,623 A    1/1992 Lewis et al. ............. 250/474.1
5,986,273 A  * 11/1999 Tripp et al. .............. 250/474.1
6,114,707 A  *  9/2000 Willems et al. ........... 250/484.2

FOREIGN PATENT DOCUMENTS

JP    01272930    4/1988
JP    02245688    3/1989
JP    02201440    1/1990
JP    3-35493     4/1991

* cited by examiner

Primary Examiner—Jeffrey Snay
Assistant Examiner—Samuel P Siefke
(74) Attorney, Agent, or Firm—Parkhurst & Wendel, LLP (57) ABSTRACT

The present composition for use in radiation exposure dose-history indicators comprises a radioactive ray-absorber and/or a radioactive ray-excited fluorescence-emitting agent, a color-developing and electron-donating organic compound and an active species-generating organic compound, which can initiate the color development of the electron-donating organic compound through the application of radioactive rays. The indicator sheet for indicating the radiation exposure dose-history comprises a matrix sheet; and a color-developing layer, which contains a color-developing and electron-donating organic compound, an active species-generating organic compound, which can initiate the color development of the electron-donating organic compound through the application of radioactive rays, and a radioactive ray-absorber and/or a radioactive ray-excited fluorescence-emitting agent and which is applied to at least part of the surface of the matrix sheet.

13 Claims, 2 Drawing Sheets

RADIATION EXPOSURE DOSE-HISTORY INDICATOR

BACKGROUND OF THE INVENTION

The present invention relates to a radiation exposure dose-history indicator, which can display the radiation dose applied to, for instance, medical appliances and the blood for transfusion, by means of the developed or changed color thereof, which permits the distinctive recognition of the color changes and which never undergoes any color deterioration or discoloration.

The radiation exposure treatments such as the application of, for instance, X-rays or γ-rays have in general been used for the sterilization of medical appliances and these treatments have recently been applied to the blood for transfusion in order to prevent any crisis of graft-versus-host diseases (TA-GVHD) due to the blood for transfusion. The radiation exposure dose applied to the blood for transfusion is not more than 1/100 times the radiation dose required for the radioactive sterilization of medical appliances and thus it reasonably ranges from 15 to 50 Gy (1,500 to 5,000 rad).

In general, to examine whether a desired radiation dose is applied to a subject to be irradiated therewith or not, radioactive rays are applied to the subject in the coexistence of an indicator including a substance, which undergoes an irreversible color change upon exposure to the rays, and after the radiation exposure, the indicator is withdrawn from the subject to confirm the color change thereof. As an example of such an indicator for the radioactive sterilization of medical appliances, those each comprising a combination of a dye susceptible to acids and polyvinyl chloride have already been put into practical use. This indicator undergoes a color change when the radiation exposure dose is not less than 5,000 to 25,000 Gy, but it never causes any color change at a radiation exposure dose level of not more than 50 Gy, which corresponds to that required for the application of radioactive rays to the blood for transfusion.

As substances, which undergo color changes at a radiation exposure dose level of 15 to 50 Gy, there have been known, for instance, inorganic crystalline substances, each of which comprises an alkaline halide of potassium chloride or the like doped with calcium. However, it is quite difficult to confirm the color change of this crystalline substance, to change its shape to those other than crystalline ones and to process the crystals. Moreover, Japanese Patent Application Publication No. Hei 7-18924 discloses an indicator, which makes use of the polymerization reaction of a polyacetylene compound upon exposure to radioactive rays. However, this polymerization reaction may proceed by the action of not only the radioactive rays, but also a heat. In other words, this indicator requires the storage at a low temperature condition and it also causes an indistinct color change due to the polymerization reaction.

These conventional indicators suffer from such a problem that they undergo insufficient color changes and this in turn leads to the misjudge of the result, since in case of the conventional indicators, whether the radiation exposure dose is reasonable or not is confirmed on the basis of color changes thereof, when subjecting a radiation exposure treatment to, for instance, the blood for transfusion.

SUMMARY OF THE INVENTION

The present invention has been developed to solve the foregoing problems associated with the conventional indicators for the quantification of the radiation exposure dose and accordingly, it is an object of the present invention to provide a composition used in an indicator, which can easily and accurately display the radiation exposure dose by means of the clear change in its color hue and which does not cause any color deterioration even if it is stored over a long period of time, as well as an indicator sheet prepared using the same.

The composition for a radiation exposure dose-history indicator according to the present invention, developed for achieving the foregoing object, comprises a radioactive ray-absorber and/or a radioactive ray-excited fluorescence-emitting agent, a color-developing and electron-donating organic compound and an active species-generating organic compound, which can induce the color development of the electron-donating organic compound through the application of radioactive rays. The composition may further comprise a hydrophilic compound.

Figure 1:
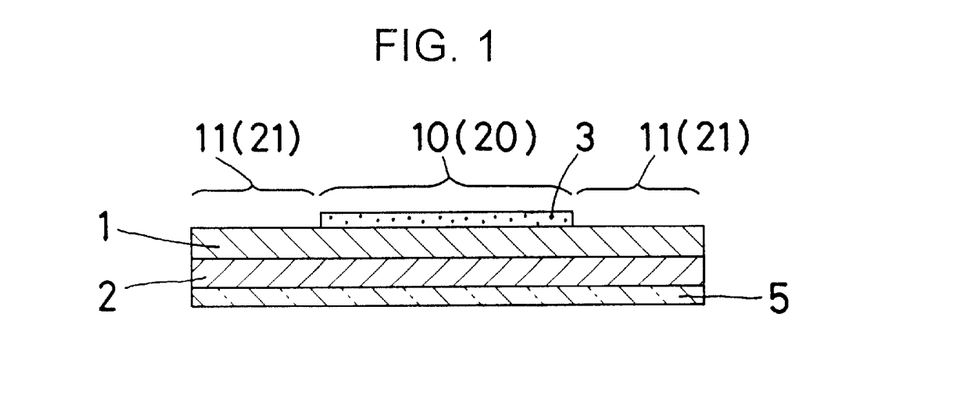
FIG. 1 is a cross sectional view showing an embodiment of the sheet for indicating the radiation exposure dose-history according to the present invention.

The indicator sheet for indicating the radiation exposure dose-history comprises a base sheet 2; and a color-developing layer 1 containing a color-developing and electron-donating organic compound, an active species-generating organic compound which can induce the color development of the electron-donating organic compound through the application of radioactive rays, and a radioactive ray-absorber and/or a radioactive ray-excited fluorescence-emitting agent, the layer 1 being applied to at least part of the surface of the base sheet 2. The color-developing layer may further comprise a hydrophilic compound.

DETAILED EXPLANATION OF THE INVENTION

The composition for a radiation exposure dose-history indicator according to the present invention comprises a radioactive ray-absorber and/or a radioactive ray-excited fluorescence-emitting agent, a color-developing and electron-donating organic compound and an active species-generating organic compound, which can induce the color development of the electron-donating organic compound through the application of radioactive rays.

More specifically, the composition for a radiation exposure dose-history indicator comprises, per 100 parts by weight of a medium, 0.01 to 50 parts by weight of a color-developing and electron-donating organic compound; 0.1 to 50 parts by weight of an active species-generating organic compound, which can induce the color development of the electron-donating organic compound through the application of radioactive rays; 0.0001 to 10 parts by weight of a hydrophilic compound; and 0.1 to 100 parts by weight of a radioactive ray-absorber and/or a radioactive ray-excited fluorescence-emitting agent. More preferably, the amount of the hydrophilic compound ranges from 0.001 to 5 parts by weight in order to convert the resulting composition for the indicator into an ink.

The radioactive ray-absorber is preferably at least one member selected from the group consisting of metals such as barium, yttrium, silver, tin, hafnium, tungsten, platinum, gold, lead, bismuth, zirconium and europium; and compounds containing these metals. Specific examples of these compounds containing such metals include sulfates, chlorides, fluorides, carbonates and nitrates.

The radioactive ray-excited fluorescence-emitting agent is preferably at least one member selected from the group consisting of salts represented by $CaWO_4$, $MgWO_4$, and $HfP_2O_7$; calcined products represented by ZnS:Ag, ZnCdS:Ag, CsI:Na, CsI:Tl, $BaSO_4$:$Eu^{2+}$, $Gd_2O_2S$:$Tb^{3+}$, $La_2O_2S$:$Tb^{3+}$, $La_2O_2S$:$Tb^{3+}$, $Y_2O_2S$:$Tb^{3+}$, $Y_2SiO_5$:Ce, LaOBr: $Tm^{3+}$, BaFCl: $Eu^{2+}$, and BaFBr: $Eu^{2+}$. ZnS:Ag as a calcined product is one produced by adding silver as a heavy metal activator to zinc sulfide as a principal component. Other calcined products can likewise be prepared by the same method.

The radioactive ray-absorber and the radioactive ray-excited fluorescence-emitting agent serve as radiation sensitizers.

The color-developing and electron-donating organic compound is preferably at least one member selected from the group consisting of triphenylmethane phthalides, fluorans, phenothiazines, indolyl phthalides, leucoauramines, Rhodamine lactams, Rhodamine lactones, indolines, and triaryl methanes.

More specifically, examples of triphenylmethane phthalides are Crystal Violet lactone and Malachite Green lactone; examples of fluorans are 3-diethylaminobenzo-α-fluoran, 3-diethylamino-7-chloro fluoran, 3-diethylamino-7-dibenzylaminofluoran and 3,6-dimethoxyfluoran; examples of phenothiazines are 3,7-bisdimethylamino-10-(4'-aminobenzoyl) phenothiazine; examples of indolyl phthalides include 3,3-bis (1-ethyl-2-methylindol-3-yl) phthalide and 3,3-bis (1-n-butyl-2-methylindol-3-yl) phthalide; examples of Leucoauramines are N-(2,3-dichlorophenyl) Leucoauramine and N-phenyl Auramine; examples of Rhodamine lactams are Rhodamine-β-o-chloroaminolactam; examples of Rhodamine lactones are Rhodamine-β-lactone; examples of indolines are 2-(phenyliminoethanedilidene)-3,3'-dimethyl indoline, p-Nitrobenzyl Leucomethylene Blue and Benzoyl Leucomethylene Blue; and examples of triaryl methanes are bis(4-diethylamino-2-methylphenyl) phenylmethane and tris(4-diethylamino-2-methylphenyl) methane. The color-developing electron-donating organic compound is usually colorless or slightly colored and can develop a color peculiar thereto through the action of active species such as Bronsted acids and Lewis acids, i.e., an electron donor.

The active species-generating organic compound preferably has a halogen atom. The compound can irreversibly generate active species upon exposure to radioactive rays and specific examples thereof include carbon tetrabromide, tribromoethanol and tribromomethyl phenyl sulfone.

The hydrophilic compound which has water retention characteristics or moisture retention characteristics, is preferably at least one member selected from the group consisting of polymers selected from carrageenan, hydroxyethyl celluloses, starches and polyvinyl alcohol; organic low molecular weight compounds selected from sodium lignin sulfonate, sorbit, mannit, maltose, propylene glycol, glycerin, alkylamines, aliphatic amides, lecithin, and sodium lactate; anionic surfactants selected from carboxylates, sulfuric esters, sulfonates and phosphates; cationic surfactants selected from salts of primary amine, salts of secondary amine, salts of tertiary amine, and quaternary ammonium salts; amphoteric surfactants selected from betaines, aminocarboxylic acids and ammonium phosphoric esters; non-ion surfactants selected from polyoxyethylene ethers, polyhydric alcohol partial esters, polyhydric alcohol partial ester partial ethers, N-hydroxyalkyl aliphatic amides, and amine oxides; and inorganic compounds selected from potassium pyrophosphate, potassium polyphosphate, sodium metaphosphate, silicate, and water-containing salts.

More specifically, among anionic surfactants, examples of carboxylates are metallic soaps that are represented by salt of fatty acid and salt of naphthenic acid; examples of sulfuric esters are sulfonated oil of glycerides, alkylsulfuric esters, alkylalcoholsulfuric esters, alkylether sulfuric esters, alkylester sulfuric esters and alkylarylether sulfuric esters; examples of sulfonates are alkyl sulfonates, sulfosuccinate and alkylaryl sulfonates; examples of phosphates are alkyl phosphates, alkylether phosphates and alkylarylether phosphates.

Among cationic surfactants, examples of salts of primary amine are monoalkyl ammonium salts; examples of salts of secondary amine are dialkyl ammonium salts: examples of salts of tertiary amine are trialkyl ammonium salts; examples of quaternary ammonium salts are tetraalkyl ammonium salts, benzalkonium salts, alkylpyridinium salts and imidazolium salts.

Among amphoteric surfactants, examples of betaines are carboxybetaines and sulfobetaines; examples of aminocarboxylic acids are amino acid derivatives.

Among nonion surfactants, examples of polyoxyethylene ethers are polyoxyethylenealkyl ether, polyoxyethylenealkylaryl ether and polyoxyethylenepolyoxypropylene glycol; examples of polyhydric alcohol partial esters are glycerin ester, sorbitan ester and sucrose ester, examples of polyhydric alcohol partial ester partial ethers are polyoxyethylene ether of glycerin mono ester, polyoxyethylene ether of sorbitan mono esters that are represented by polyoxyethylene ether of sorbitan monourethalate, and polyoxyethylene ether of sorbitol diester, examples of N-hydroxyalkyl aliphatic amides are hydroxyalkyl fatty acid amide and N-polyoxyethylene fatty acid amide.

Water-containing salts among inorganic compounds, are metallic salts that contain crystal water. Examples of water-containing salts are $BaCl_2.2H_2O$, $Al_2(SO_4)_3$ containing 14 to 18 crystal waters, $CaSO_4.2H_2O$ and $NiSO_4.7H_2O$.

The hydrophilic compound is used for controlling the discoloration and therefore, has water retention characteristics and moisture retention characteristics.

Examples of the mediums usable herein include ink vehicles.

The indicator sheet for indicating the radiation exposure dose-history developed for accomplishing the foregoing object, according to the present invention comprises a matrix sheet; and a composition for indicators comprising a radioactive ray-absorber and/or a radioactive ray-excited fluorescence-emitting agent, a color-developing and electron-donating organic compound and an active species-generating organic compound, which can induce the color development of the electron-donating organic compound through the application of radioactive rays, the composition being applied to at least part of the matrix sheet. The matrix sheet is preferably one made of paper or a resin.

Now, we will hereunder describe, in detail with reference to the accompanying drawings, another embodiment of the indicator sheet for indicating the radiation exposure dose-history developed for accomplishing the foregoing object, according to the present invention. The indicator sheet for indicating the radiation exposure dose-history (hereinafter simply referred to as "dose-history indicator sheet") according to another embodiment comprises, as will be seen from FIG. 1, a color-developing (or changing) layer 1, which comprises a color-developing and electron-donating organic compound, an active species-generating organic compound, which can induce the color development of the electron-donating organic compound through the application of radioactive rays, a hydrophilic compound and a radioactive ray-sensitizer and which is applied to at least part of the surface of the matrix sheet.

The dose-history indicator sheet may have a layer 3 of a dye, which has a color hue similar to that of the color-changing layer 1 prior to or after the color change, on a part of the color-changing layer 1. The layer 3 may suitably be formed by printing the color-changing layer 1 thereon with an ink containing a desired dye.

Figure 2:
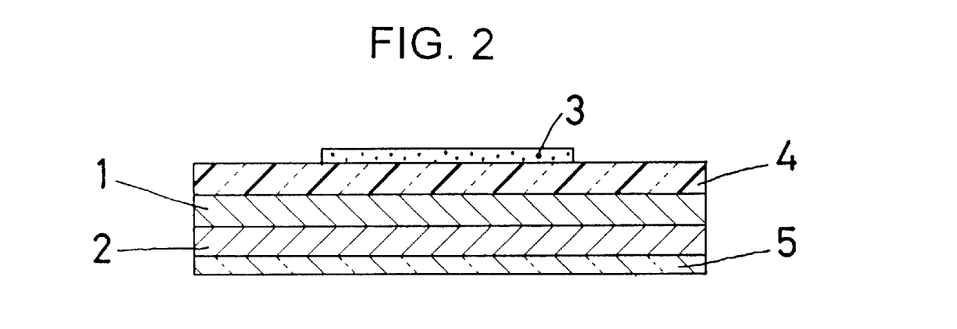
FIG. 2 is a cross sectional view showing another embodiment of the sheet for indicating the radiation exposure dose-history according to the present invention.

The color-changing layer 1 is preferably covered with a transparent or translucent protective film 4, as shown in FIG. 2. The protective film 4 is used for shielding ultraviolet light rays and examples of materials therefor include films of polyimide, polyethylene terephthalate or polypropylene and those comprising these films, which comprise a UV absorber incorporated therein or deposited thereon. The color-changing layer 1 can suitably be covered with the protective film 4 by applying the latter to the former through an adhesive layer. It is also possible to cover the color-changing layer 1 with the protective film 4 by sandwiching the layer 1 and the matrix sheet 2 between the protective film 4 and an adhesive layer.

The color-changing layer 1 may completely or partially be covered with the protective film 4.

It is preferred that the protective layer 4 be provided with, at least part of either of the sides thereof, a dye layer 3 whose color hue is similar to that of the color-changing layer 1 prior to or after the color change of the layer 1.

Figure 3:
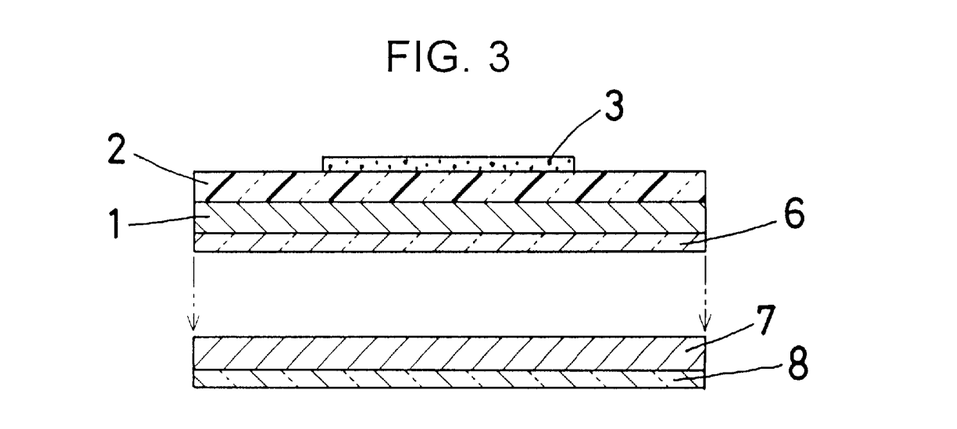
FIG. 3 is a cross sectional view showing a still another embodiment of the sheet for indicating the radiation exposure dose-history according to the present invention.

Alternatively, the dose-history indicator sheet may comprise, as shown in FIG. 3, a matrix sheet 2, which also serves as a transparent or translucent protective sheet, and an adhesive layer 6 which is applied to the non-observation plane of the film 2.

It is preferred that the protective layer 2 be provided with, at least part of either of the sides thereof, a dye layer 3 whose color hue is similar to that of the color-changing layer 1 prior to or after the color change of the layer 1. The protective film 2 is applied for shielding ultraviolet light rays and examples of materials therefor include films of polyimide, polyethylene terephthalate or polypropylene and those comprising these films, which comprise a UV absorber incorporated therein or deposited thereon.

Another matrix sheet 7 may be adhered to the adhesive layer 6.

As has been shown in FIGS. 1 and 2, an adhesive layer 5 may be applied to the non-observation plane of the matrix sheet 2. In addition, as shown in FIG. 3, an adhesive layer 8 may be applied to the non-observation plane of the matrix sheet 7. Examples of materials for preparing the adhesive layers 5, 6 and 8 include rubber type adhesives, resin type adhesives and silicone type adhesives. These adhesive layers 5, 6 and 8 may be provided thereon with a sheet of release paper.

The matrix sheets are preferably those prepared from a resin such as polyester, polystyrene and polycarbonate or paper.

To display the radiation exposure dose-history, there may be used a dose-history indicator sheet prepared by applying the composition of the invention for indicators onto the surface of a matrix sheet made of, for instance, paper or a resin. The dose-history indicator sheet placed in the vicinity of a subject to be irradiated with radioactive rays upon a radiation exposure treatment undergoes a color change to an extent, which varies depending on the radiation exposure dose to thus develop a variety of color hue depending on the radiation exposure dose-history. The desired color hue developed by the dose-history indicator sheet indicates that a desired level of the radiation dose is applied to the subject to be irradiated. In this respect, it is preferred that the dose-history indicator sheet be accompanied by a standard color, which corresponds to a desired radiation dose. If the dose-history indicator sheet comprises a hydrophilic compound, the color-developed indicator sheet never undergoes any color deterioration and any change of the color hue.

It would be assumed that the indicator sheet causes its color change through the application of radioactive rays according to the following mechanism. That is, when radioactive rays are applied to the indicator sheet, the radioactive ray-absorber present in the indicator sheet absorbs, scatters the rays to thus cause a phenomenon wherein electrons are emitted and paired electrons are formed through the photoelectric effect and the Compton effect. Alternatively, the radioactive ray-excited fluorescence-emitting agent absorbs radioactive rays applied onto the indicator sheet to thus cause a phenomenon similar to that observed for the radioactive ray-absorber and to simultaneously cause fluorescence-phosphorescence-emitting phenomenon. These phenomena would proceed the reaction wherein active species are generated from the active species-generating organic compound. The resulting active species have an electron-receiving ability and accordingly, induce the charge transfer phenomenon of the co-existing color-developing and electron-donating organic compound. For this reason, the electron-donating compound develops a color peculiar thereto because of the change in the electron density and this in turn results in the color change of the indicator sheet.

It would likewise be assumed that the color deterioration of the indicator sheet would be inhibited by the following mechanism, although the details thereof have not yet been clearly elucidated. That is, the application of radioactive rays to the co-existing hydrophilic compound and the moisture present therein is accompanied by the generation of electron receptors such as hydrogen ions and these electron receptors would stabilize the color-developed electron-donating organic compound to thus inhibit any color deterioration of the indicator sheet. Accordingly, the indicator sheet after the color development or the development of the color hue thereof can be stored over a long period of time.

The radioactive ray-absorber and the radioactive ray-excited fluorescence-emitting agent accelerate the generation of the active species even when a small quantity of radioactive rays on the order of about 5 Gy are applied to the indicator sheet and therefore, the indicator sheet certainly undergoes its color change. This indicator sheet can display a quite wide range of radiation exposure dose extending from 5 Gy to 25,000 Gy.

In this connection, the color hue and contrast of the color observed after the color change as well as the rate of color deterioration can variously be controlled by adjusting or selecting the kinds and mixing ratio of the foregoing components incorporated into the composition for indicators, depending on the radiation exposure dose to be controlled and applied to each subject.

Various embodiments of the composition for an indicator for confirming the dose-history of a subject and the dose-history indicator sheet according to the present invention will be described in more detail below.

To an ink vehicle, there are added, with stirring, a radioactive ray-absorber, a color-developing and electron-donating organic compound, and an active species-generating organic compound, followed by uniformly mixing them, and subsequent application of the resulting mixture onto the surface of a plastic matrix sheet to thus give a dose-history indicator sheet. Radiations such as X-rays and γ-rays are applied to a subject to be irradiated, while applying the resulting indicator sheet to the subject. After the completion of the radiation irradiation, the indicator sheet is recovered. Thus, whether a subject is exposed to a desired dose of radiation or not can be confirmed or judged by examining the color hue developed on the indicator sheet.

This indicator sheet causes a distinct change in the color hue before and after the radiation exposure and thus permits simple and accurate confirmation of the level of the radiation exposure dose, but after the color change, the indicator sheet gradually undergoes color deterioration and therefore, the color hue developed after the color change cannot be held over a long period of time. Therefore, the color hue observed immediately after the color change must be recorded by means of, for instance, a photograph.

We will hereunder describe, in detail, another embodiment of the composition for indicators as means for confirming the radiation exposure dose-history, according to the present invention.

A radioactive ray-absorber and a hydrophilic compound are stirred in water, followed by the evaporation of the water, addition of a color-developing and electron-donating organic compound, an active species-generating organic compound and an ink vehicle with stirring and uniform mixing of these components to thus give a composition for indicators.

The resulting composition for indicators is applied onto the surface of a plastic matrix sheet to form an indicator sheet. Radiations such as X-rays and γ-rays are applied to a subject to be irradiated, while applying the resulting indicator sheet to the subject. After the completion of the radiation irradiation, the indicator sheet is recovered. Thus, whether a subject is exposed to a desired dose of radiation or not can be confirmed or judged by examining the color hue developed on the indicator sheet. This indicator sheet never causes any color deterioration even after the storage over a long period of time and accordingly, the sheet can be stored over a long period of time as evidence that the corresponding subject is exposed to a desired dose of radiation.

Figure 4:
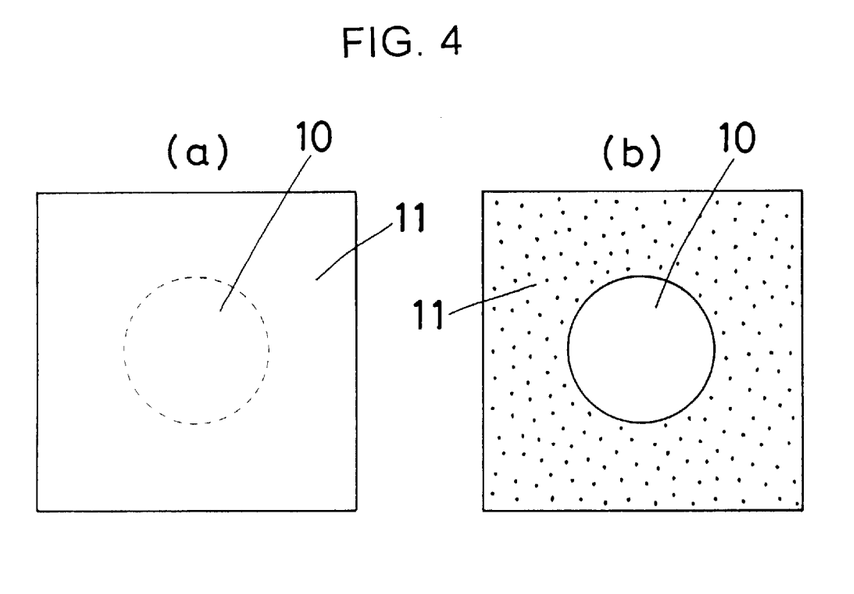
FIG. 4 is a plan view of an embodiment of the sheet for indicating the radiation exposure dose-history according to the present invention, which is in a practical use condition.

FIG. 1 is a cross sectional view showing an embodiment of the indicator sheet for confirming the radiation exposure dose-history according to the present invention. As will be seen from FIG. 1, the dose-history indicator sheet of the invention comprises, for instance, a matrix sheet; and a color-changing layer 1, which comprises a composition containing indolyl phthalides as the color-developing and electron-donating organic compound, carbon tetrabromide as the active species-generating organic compound, carrageenan as the hydrophilic compound and barium sulfate as the radioactive ray-sensitizer in a medium, and which is applied onto the surface of the plastic matrix sheet. Patterns or letters are printed on the color-changing layer 1 using an ink containing a dye 3 whose color hue is similar to that of the layer 1. As has been shown in FIG. 4(a), the color hue of the portion 10 carrying printed patterns is similar to that of the portion 1 free of any printed pattern. The matrix sheet 2 is provided with an adhesive layer 5 on the non-observation plane.

Upon radiation exposure, radioactive rays such as X-rays or γ-rays are applied to a subject, while applying this indicator sheet to the subject. After the completion of the radiation exposure, the indicator sheet is recovered from the subject. The condition of the indicator sheet observed at this stage is shown in FIG. 4(b). The color-changing layer 1 develops a color peculiar thereto upon application of radioactive rays. At this stage, only the color hue of the ink is observed on the portion 10 carrying printed patterns, while there is observed, on the portion 11 free of any printed pattern, the color hue of the color-changing layer 1 developed after the radiation exposure. As a result, the portion 10 appears as a marginal pattern (colored except inside). Thus, whether the corresponding subject is irradiated with a desired dose of radioactive rays or not can be confirmed.

Figure 5:
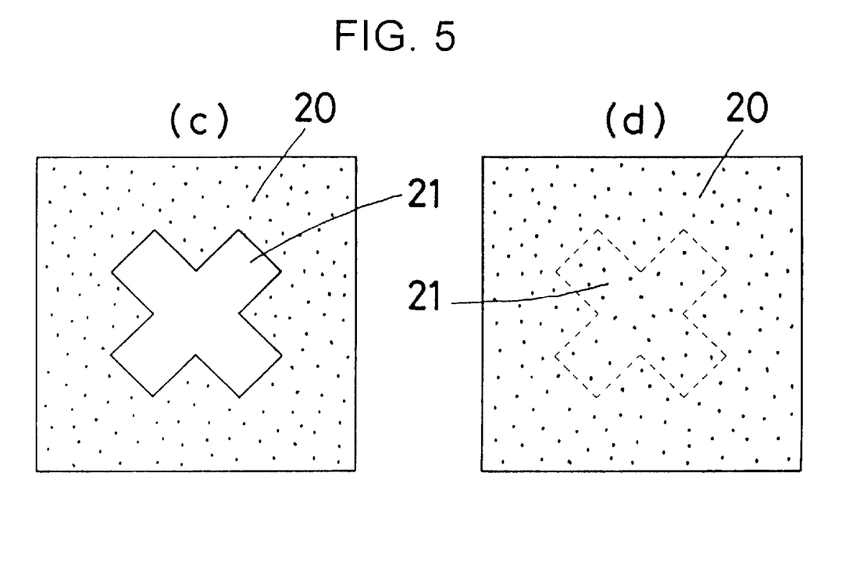
FIG. 5 is a plan view of another embodiment of the sheet for indicating the radiation exposure dose-history according to the present invention, which is in a practical use condition.

In this respect, a marginal pattern can be printed on the color-changing layer of this indicator sheet using an ink containing a dye 3 whose color hue is similar to that observed for the color-changing layer, as has been shown in FIG. 5(c). The color hue of the portion 20 carrying printed patterns differs from that observed for the portion 21 free of any printed pattern, prior to the application of radioactive rays. Therefore, the portion 21 free of any printed pattern appears as a marginal pattern. When applying radioactive rays to the indicator sheet, the color hue developed in the color-changing layer 1 is observed on the portion 21 free of any printed pattern and is similar to that observed on the portion 20 carrying printed patterns, as will be seen from FIG. 5(d). As a result, the marginal pattern cannot be clearly distinguished therefrom.

In the following Examples 1 to 20, the dose-history indicator sheets according to the present invention were produced by way of trial. Separately, indicator sheets beyond the scope of the present invention were also produced by way of trial in the following Comparative Examples 1 to 4.

EXAMPLE 1

An ink was first prepared by mixing 10 parts by weight of an indolyl phthalide or Purgus Chript Red 1-6B (available from Chiba Specialty Chemicals Co., Ltd.) as the color-developing and electron-donating organic compound, 10 parts by weight of carbon tetrabromide as the radioactive ray-activator, 10 parts by weight of barium sulfate as the radioactive ray-absorber, and 100 parts by weight of an ink vehicle as a medium (PAS-800 INKMEDIUM, available from Jyujyo Chemical Industries, Inc.). The resulting ink was applied onto the surface of a matrix sheet made of a polyethylene film to thus give an indicator sheet.

EXAMPLES 2 TO 6

Indicator sheets were prepared by repeating the same procedures used in Example 1 except that the color-developing and electron-donating organic compounds specified in the following Table 1 were used in place of the Purgus Chript Red 1-6B used in Example 1.

EXAMPLES 7 AND 8

The same procedures used in Example 1 were repeated except that the active species-generating organic compounds specified in Table 1 were substituted for the carbon tetrabromide used in Example 1 to thus give each corresponding indicator sheet.

EXAMPLES 9 TO 19

The same procedures used in Example 1 were repeated except that the radioactive ray-absorbers or radioactive ray-excited fluorescence-emitting agents specified in Table 1 were substituted for the barium sulfate used in Example 1 to thus give each corresponding indicator sheet.

EXAMPLE 20

The same procedures used in Example 1 were repeated except that the amounts of the Purgus Chript Red 1-6B and carbon tetrabromide were changed to those specified in Table 1 to give an indicator sheet.

Comparative Example 1

The same procedures used in Example 1 were repeated except that Purgus Chript Red 1-6B was not incorporated into the composition to give an indicator sheet.

Comparative Example 2

The same procedures used in Example 1 were repeated except that carbon tetrabromide was not incorporated into the composition to give an indicator sheet.

Comparative Example 3

The same procedures used in Example 1 were repeated except that barium sulfate was not incorporated into the composition to give an indicator sheet.

Comparative Example 4

The same procedures used in Example 1 were repeated except that the amounts of the Purgus Chript Red 1-6B and carbon tetrabromide were changed to those specified in Table 1 and that barium sulfate was not incorporated into the composition to give an indicator sheet.

The indicator sheets prepared in Examples 1 to 19 and Comparative Examples 1 to 3 were exposed to X-rays at a dose of 15 Gy using an X-ray exposure device: MBR-1520A-2 (available from Hitachi Medico Co., Ltd.) and then these indicator sheets were visually inspected for any change in their color hues. Separately, the indicator sheets prepared in Example 20 and Comparative Example 4 were exposed to X-rays at a dose of 5000 Gy using the same X-ray exposure device and visually inspected for any change in their color hues according to the same method used above.

The results observed for the indicator sheets of Examples 1 to 20 are summarized in Table 1, while those observed for the indicators sheets of Comparative Examples 1 to 4 are listed in the following Table 2.

The indicator sheets prepared in Examples 1 to 20 and Comparative Examples 1 to 4 were exposed to γ-rays using a γ-ray exposure device: GammaCell-1000Elite (available from MDS Nordion Co., Ltd.) instead of X-rays. These indicator sheets exposed as same as X-ray exposures were visually inspected for any change in their color hues. The results were the same as Table 1 and Table 2.

TABLE 1

| Ex. No. | Component A (numeral:amount) | Component B (numeral:amount) | Components C & D (numeral:amount) | Color Hue Before & After Exposure Before | After |
|---|---|---|---|---|---|
| 1 | RSR I-6B (10) | $CBr_4$ (10) | $BaSO_4$ (10) | White | Red |
| 2 | CVL (10) | $CBr_4$ (10) | $BaSO_4$ (10) | White | Dark Blue |
| 3 | DABF (10) | $CBr_4$ (10) | $BaSO_4$ (10) | White | Pink |
| 4 | BBMP (10) | $CBr_4$ (10) | $BaSO_4$ (10) | White | Red |
| 5 | RCAL (10) | $CBr_4$ (10) | $BaSO_4$ (10) | White | Purple |
| 6 | BRMB (10) | $CBr_4$ (10) | $BaSO_4$ (10) | White | Blue |
| 7 | PSR I-6B (10) | $Br_3Et$ (10) | $BaSO_4$ (10) | White | Red |
| 8 | PSR I-6B (10) | TBMPS (10) | $BaSO_4$ (10) | White | Red |
| 9 | PSR I-6B (10) | $CBr_4$ (10) | $BaF_2$ (10) | White | Red |
| 10 | PSR I-6B (10) | $CBr_4$ (10) | $BiCl_3$ (10) | White | Red |
| 11 | PSR I-6B (10) | $CBr_4$ (10) | Ag (10) | White | Red |
| 12 | PSR I-6B (10) | $CBr_4$ (10) | Sn (10) | White | Red |
| 13 | PSR I-6B (10) | $CBr_4$ (10) | Pt (10) | White | Red |
| 14 | PSR I-6B (10) | $CBr_4$ (10) | Au (10) | White | Red |
| 15 | PSR I-6B (10) | $CBr_4$ (10) | Pb (10) | White | Red |
| 16 | PSR I-6B (10) | $CBr_4$ (10) | $CaWO_4$ (10) | White | Red |
| 17 | PSR I-6B (10) | $CBr_4$ (10) | $Y_2SiO_5$:Ce (10) | White | Red |
| 18 | PSR I-6B (10) | $CBr_4$ (10) | $HfP_2O_7$ (10) | White | Red |
| 19 | PSR I-6B (10) | $CBr_4$ (10) | $BaFCl:Eu^{2+}$ (10) | White | Red |
| 20 | PSR I-6B (1) | $CBr_4$ (1) | $BaSO_4$ (10) | White | Dark Red |

TABLE 2

| | Comparative Examples | | | | |
|---|---|---|---|---|---|
| Ex. No. | Component A (numeral: amount) | Component B (numeral: amount) | Components C & D (numeral: amount) | Color Hue Before & After Exposure Before | After |
| 1 | — | $CBr_4$ (10) | $BaSO_4$ (10) | White | White |
| 2 | PSR I-6B (10) | — | $BaSO_4$ (10) | White | White |
| 3 | PSR I-6B (10) | $CBr_4$ (10) | — | Colorless | Colorless |
| 4 | PSR I-6B (1) | $CBr_4$ (1) | — | Colorless | Colorless |

TABLE 2-continued

Comparative Examples

| Ex. No. | Component A (numeral: amount) | Component B (numeral: amount) | Components C & D (numeral: amount) | Color Hue Before & After Exposure | |
|---|---|---|---|---|---|
| | | | | Before | After |

Note: The amount of each component is expressed in terms of "part by weight" per 100 parts by weight of the ink vehicle.
Component A: color-developing and electron-donating organic compound;
Component B: active species-generating organic compound;
Component C: radioactive ray-absorber;
Component D: radioactive ray-excited fluorescence-emitting agent;
PSR I-6B: Purgus Chript Red 1-6B.

The results shown in these Tables clearly indicate that when applying radioactive rays at a dose of 15 Gy, the indicator sheets of Examples 1 to 19 according to the present invention cause distinct changes in color hue, which can clearly be confirmed with the naked eyes, while the indicator sheets of Comparative Examples 1 to 3, which are beyond the scope of the present invention, never cause any change in color hue.

Moreover, when applying radioactive rays at a dose of 5000 Gy, the indicator sheet of Example 20 according to the present invention causes a distinct change in color hue, which can clearly be confirmed with the naked eyes, while the indicator sheet of Comparative Examples 4, which is beyond the scope of the present invention, never causes any change in color hue.

We will explain, in detail below, other indicator sheets prepared, by way of trial, in the following Examples. The composition for dose-history indicators according to the present invention is used in Examples 21 to 31, while a conventional composition for indicators is used in Comparative Example 5 to thus prepare each corresponding indicator sheet.

EXAMPLE 21

There were stirred in water, 10 parts by weight of barium sulfate as the radioactive ray-absorber and 0.5 part by weight of carrageenan as the hydrophilic compound, followed by evaporation of moisture to give a mixture containing the radioactive ray-absorber and the hydrophilic compound. The resulting mixture was blended with 10 parts by weight of an indolyl phthalide or Purgus Chript Red 1-6B (available from Chiba Specialty Chemicals Co., Ltd.) as the color-developing and electron-donating organic compound, 10 parts by weight of carbon tetrabromide as the radioactive ray-activator and 100 parts by weight of an ink vehicle as a medium (PAS-800 INK MEDIUM, available from Jyujyo Chemical Industries, Inc.) to give a composition for dose-history indicators. The resulting ink was applied onto the surface of a matrix sheet made of a polyethylene film to thus give an indicator sheet.

EXAMPLES 22 TO 26

Indicator sheets were prepared by repeating the same procedures used in Example 21 except that the color-developing and electron-donating organic compounds specified in the following Table 3 were used in place of Purgus Chript Red 1-6B used in Example 21.

EXAMPLES 27 AND 28

The same procedures used in Example 21 were repeated except that the active species-generating organic compounds specified in Table 3 were substituted for the carbon tetrabromide used in Example 21 to thus give each corresponding indicator sheet.

EXAMPLES 29 TO 31

The same procedures used in Example 21 were repeated except that the hydrophilic compounds specified in Table 3 were substituted for the carrageenan used in Example 21 to thus give each corresponding indicator sheet.

Comparative Example 5

The same procedures used in Example 21 were repeated except that any hydrophilic compound was not used at all to thus give a comparative indicator sheet.

The indicator sheets prepared in Examples 21 to 31 and Comparative Example 5 were exposed to X-rays at a dose of 15 Gy using an X-ray exposure device: MBR-1 520A-2 (available from Hitachi Medico Co., Ltd.). Then, these indicator sheets were withdrawn from the exposure device, stored in a thermostatic chamber maintained at 40° C. for 3 weeks and visually inspected for any change in their color tones.

The results observed for the indicator sheets of Examples 21 to 31 and Comparative Example 5 are summarized in Table 3.

The indicator sheets prepared in Examples 21 to 31 and Comparative Examples 5 were exposed to γ-rays using a γ-ray exposure device: GammaCell-1000Elite (available from MDS Nordion Co., Ltd.) instead of X-rays. These indicator sheets exposed as same as X-ray exposures were visually inspected for any change in their color hues. The results were the same as Table 3.

TABLE 3

| Ex. No. | Comp. A (num.:Amt.) | | Comp. B (num.:Amt.) | | Comp. C, D (num.:Amt.) | | Comp. E (num.:Amt.) | | Color Hue Before and After Exposure | | |
|---|---|---|---|---|---|---|---|---|---|---|---|
| | | | | | | | | | Just Before | Just After | After 3 Weeks |
| 21 | PSR I-6B | (10) | $CBr_4$ | (10) | $BaSO_4$ | (10) | Carr. | (0.5) | White | Red | Red |
| 22 | CVL | (10) | $CBr_4$ | (10) | $BaSO_4$ | (10) | Carr. | (0.5) | White | Dark Blue | Dark Blue |
| 23 | DABF | (10) | $CBr_4$ | (10) | $BaSO_4$ | (10) | Carr. | (0.5) | White | Pink | Pink |
| 24 | BBMP | (10) | $CBr_4$ | (10) | $BaSO_4$ | (10) | Carr. | (0.5) | White | Red | Red |
| 25 | RCAL | (10) | $CBr_4$ | (10) | $BaSO_4$ | (10) | Carr. | (0.5) | White | Purple | Purple |
| 26 | BRMB | (10) | $CBr_4$ | (10) | $BaSO_4$ | (10) | Carr. | (0.5) | White | Blue | Blue |
| 27 | PSR I-6B | (10) | $Br_3Et$ | (10) | $BaSO_4$ | (10) | Carr. | (0.5) | White | Red | Red |
| 28 | PSR I-6B | (10) | TMPS | (10) | $BaSO_4$ | (10) | Carr. | (0.5) | White | Red | Red |

TABLE 3-continued

| Ex. No. | Comp. A (num.:Amt.) | | Comp. B (num.:Amt.) | | Comp. C, D (num.:Amt.) | | Comp. E (num.:Amt.) | | Color Hue Before and After Exposure | | |
|---|---|---|---|---|---|---|---|---|---|---|---|
| | | | | | | | | | Just Before | Just After | After 3 Weeks |
| 29 | PSR I-6B | (10) | $CBr_4$ | (10) | $BaSO_4$ | (10) | HEC | (0.5) | White | Red | Red |
| 30 | PSR I-6B | (10) | $CBr_4$ | (10) | $BaSO_4$ | (10) | Starch | (0.5) | White | Red | Red |
| 31 | PSR I-6B | (10) | $CBr_4$ | (10) | $BaSO_4$ | (10) | PVA | (0.5) | White | Red | Red |
| 5* | PSR I-6B | (10) | $CBr_4$ | (10) | $BaSO_4$ | (10) | — | | White | Red | Pale Red |

*:Comparative Example
Comp. A: color-developing and electron-donating organic compound;
Comp. B: active species-generating organic compound;
Comp. C: radioactive ray-absorber;
Comp. D: radioactive ray-excited fluorescence-emitting agent;
Comp. E: hydrophilic compound; PSR I-6B: Purgus Chript Red I-6B; CVL: Crystai Violet Lactone; DABF: 3-diethylaminobenzo- α-fluoran; BBMP: 3,3-bis(1-n-butyl-2-methylindol-3-yl) phthalide; RCAL: Rhodamine-β-o-Chloroaminolactam; BRMB: Benzoyl Leucomethylene Blue; $Br_3Et$: tribromoethanol; TMPS: tribromomethyl phenyl sulfone; Carr.: carrageenan; HEC: hydroxyethyl cellulose; PVA: polyvinyl alcohol.
Note: The amount of each component is expressed in terms of "part by weight" per 100 parts by weight af the ink vehicle.

As will be seen from the data listed in Table 3, when using the composition for indicators according to the present invention, the resulting indicator sheets could be stored without causing any color deterioration of the color hue developed after the radiation exposure.

Incidentally, a solvent, a resin or a coagulating agent may be incorporated into the compositions for indicators prepared in Examples 1 to 31. The composition for indicators may directly be applied to or printed on a subject to be exposed to radioactive rays or may be stored in a lidded container made of a resin or glass or may be enclosed in a sealed tube. The indicator sheet may be provided with an adhesive layer provided with release paper on the non-observation plane of the matrix sheet thereof. Therefore, the indicator sheet can be adhered to a subject after peeling off the release paper.

As has been described above in detail, the indicator sheet, which makes use of the composition for radiation exposure dose-history indicators according to the present invention permits the licensed engineer of radiation to confirm whether the radiation exposure dose is appropriate or not when the blood for transfusion or medical appliances or tools are treated by the application of radioactive rays thereto. The indicator sheet undergoes a distinct color change upon irradiation with radioactive rays and permits simple and accurate confirmation of the level of the radiation exposure dose because of the color difference between its colors observed before and after the application of radioactive rays. Furthermore, the indicator sheet can display the radiation exposure dose over a quite wide range. The color hue once developed never causes color deterioration or discoloration over a long period of time. The indicator sheet can thus be stored over a long period of time as evidence that a subject is exposed to a desired dose of radioactive rays. This indicator sheet can easily be processed.

What is claimed is:

1. A composition for use in radiation exposure dose-history indicators comprising a radioactive ray-absorber and/or a radioactive ray-excited fluorescence-emitting agent, a color-developing and electron-donating organic compound and an active species-generating organic compound, which can initiate the color development of the electron-donating organic compound through the application of radioactive rays.

2. A composition for use in radiation exposure dose-history indicators comprising, per 100 parts by weight of a medium, 0.01 to 50 parts by weight of a color-developing and electron-donating organic compound; 0.1 to 50 parts by weight of an active species-generating organic compound, which can initiate the color development of the electron-donating organic compound through the application of radioactive rays; 0.0001 to 10 parts by weight of a hydrophilic compound; and 0.1 to 100 parts by weight of a radioactive ray-absorber and/or a radioactive ray-excited fluorescence-emitting agent.

3. The composition for use in radiation exposure dose-history indicators as set forth in claim 1 wherein the radioactive ray-absorber is at least one member selected from the group consisting of barium, yttrium, silver, tin, hafnium, tungsten, platinum, gold, lead, bismuth, zirconium, europium, and compounds containing these metals; the radioactive ray-excited fluorescence-emitting agent is at least one member selected from the group consisting of salts represented by $CaWO_4$, $MgWO_4$, and $HfP_2O_7$; calcined products represented by ZnS:Ag, ZnCdS:Ag, CsI:Na, CsI:Tl, $BaSO_4$:$Eu^{2+}$, $Gd_2O_2S$:$Tb^{3+}$, $La_2O_2S$:$Tb^{3+}$, $La_2O_2S$:$Tb^{3+}$, $Y_2O_2S$:$Tb^{3+}$, $Y_2SiO_5$:Ce, LaOBr:$Tm^{3+}$, BaFCl:$Eu^{2+}$, and BaFBr:$Eu^{2+}$; the color-developing electron-donating organic compound is at least one member selected from the group consisting of triphenylmethane phthalides, fluorans, phenothiazines, indolyl phthalides, leucoauramines, Rhodamine lactams, Rhodamine lactones, indolines, and triaryl methanes; and the active species-generating organic compound is a halogen atom-containing compound.

4. The composition for use in radiation exposure dose-history indicators as set forth in claim 2 wherein the hydrophilic compound which has water retention characteristics or moisture retention characteristics, is at least one member selected from the group consisting of polymers selected from carrageenan, hydroxyethyl celluloses, starches and polyvinyl alcohol; organic low molecular weight compounds selected from sodium lignin sulfonate, sorbit, mannit, maltose, propylene glycol, glycerin, alkylamines, aliphatic amides, lecithin, and sodium lactate; anionic surfactants selected from carboxylates, sulfuric esters, sulfonates and phosphates; cationic surfactants selected from salts of primary amine, salts of secondary amine, salts of tertiary amine, and quaternary ammonium salts; amphoteric surfactants selected from betaines, aminocarboxylic acids and ammonium phosphoric esters; nonion surfactants selected from polyoxyethylene ethers, polyhydric alcohol partial esters, polyhydric alcohol partial ester partial ethers, N-hydroxyalkyl aliphatic amides, and amine oxides; and inorganic compounds selected from potassium pyrophosphate, potassium polyphosphate, sodium metaphosphate, silicate, and water-containing salts.

5. A sheet for indicating the radiation exposure dose-history comprising a matrix sheet; and a composition for indicators which comprises a radioactive ray-absorber and/or a radioactive ray-excited fluorescence-emitting agent, a color-developing and electron-donating organic compound and an active species-generating organic compound capable of initiating the color development of the electron-donating organic compound through the application of radioactive rays and which is applied onto at least part of the matrix sheet.

6. A sheet for indicating the radiation exposure dose-history comprising a matrix sheet; and a color-developing layer, which contains a color-developing and electron-donating organic compound, an active species-generating organic compound capable of initiating the color development of the electron-donating organic compound through the application of radioactive rays, a hydrophilic compound, a radioactive ray-absorber and/or a radioactive ray-excited fluorescence-emitting agent and which is applied to at least part of the surface of the matrix sheet.

7. The sheet for indicating the radiation exposure dose-history as set forth in claim 6 wherein it further comprises a dye, whose color hue is similar to that observed for the color-developing layer prior to or after the radiation exposure thereof, on at least part of the layer.

8. The sheet for indicating the radiation exposure dose-history as set forth in claim 6 wherein the color-developing layer is covered with a transparent or translucent protective film layer.

9. The sheet for indicating the radiation exposure dose-history as set forth in claim 8 wherein it further comprises a dye, whose color hue is similar to that observed for the color-developing layer prior to or after the radiation exposure thereof, on at least part of either of the sides of the protective film layer.

10. The sheet for indicating the radiation exposure dose-history as set forth in claim 6 wherein the matrix sheet is a transparent or translucent protective film sheet and the protective film sheet is provided with an adhesive layer on the non-observation plane thereof.

11. The sheet for indicating the radiation exposure dose-history as set forth in claim 10 wherein it further comprises a dye, whose color hue is similar to that observed for the color-developing layer prior to or after the radiation exposure thereof, on at least part of either of the sides of the protective film layer.

12. The sheet for indicating the radiation exposure dose-history as set forth in claim 11 wherein a different matrix sheet is adhered to the adhesive layer.

13. The sheet for indicating the radiation exposure dose-history as set forth in claim 6 wherein the matrix sheet is provided with an adhesive layer adhered to the non-observation plane thereof.

* * * * *